(12) United States Patent
Chen

(10) Patent No.: US 6,674,190 B2
(45) Date of Patent: Jan. 6, 2004

(54) VEHICLE ELECTRICAL GENERATOR

(75) Inventor: Ting-Hsing Chen, Tainan Hsien (TW)

(73) Assignee: Far Great Plastics Industrial Co., Ltd., Tainan Hsien (TW)

( * ) Notice: Subject to any disclaimer, the term of this patent is extended or adjusted under 35 U.S.C. 154(b) by 78 days.

(21) Appl. No.: 09/955,988

(22) Filed: Sep. 20, 2001

(65) Prior Publication Data

US 2003/0052556 A1 Mar. 20, 2003

(51) Int. Cl.[7] ................................................. H02K 7/00

(52) U.S. Cl. .................. 310/67 A; 310/67 R; 310/75 R

(58) Field of Search .............................. 310/67 R, 67 A, 310/75 C, 75 R, 75 D

(56) References Cited

U.S. PATENT DOCUMENTS

| | | | | |
|---|---|---|---|---|
| 4,677,328 A | * | 6/1987 | Kumakura | 310/67 R |
| 5,874,792 A | * | 2/1999 | Chen et al. | 310/75 C |
| 5,932,943 A | * | 8/1999 | Werner et al. | 310/67 A |
| 6,002,187 A | * | 12/1999 | Ohkura et al. | 310/67 A |

* cited by examiner

*Primary Examiner*—Nestor Ramirez
*Assistant Examiner*—Judson H. Jones
(74) *Attorney, Agent, or Firm*—Rosenberg, Klein & Lee

(57) ABSTRACT

A vehicle electrical generator comprises a magnetic ring on one side of a wheel, and an inductive coil on a shaft of the wheel corresponding to the magnetic ring, thus when rolling the wheel, the magnetic ring rotating with the wheel within the inductive coil, this rotation produces electricity, which then transferred by a pair of negative and positive wires to the load.

1 Claim, 3 Drawing Sheets

VEHICLE ELECTRICAL GENERATOR

BACKGROUND OF THE INVENTION

1. Field of the Invention

This invention relates to an electrical generator, and more particular to a vehicle generates electricity by rolling the wheels.

2. Description of the Prior Art

There are various kinds of recreational vehicles, such as skateboards, tricycles or bicycles for fin or convenience of short distance travel. Some of the vehicles are equipped with a generator to generate electricity for illumination purpose. However, this generator can provide only to some illumination parts, and is not able to provide other devices, which requires electricity to operate, this design is not attractive.

A modernized design was invented, which is equipped with many auxiliaries, such as horns, lights, etc., however, these also require many wires.

SUMMARY OF THE INVENTION

It is the primary object of the present invention to provide a renovated vehicle electrical generator, which is able to provide electricity itself for auxiliaries.

It is another object of the present invention to provide a renovated vehicle electrical generator, which is economical in produce.

It is a further object of the present invention to provide a renovated vehicle electrical generator, which is easy to operate, and able to provide a safety signal for the users.

DETAILED DESCRIPTION OF THE PREFERRED EMBODIMENTS

Figure 1:
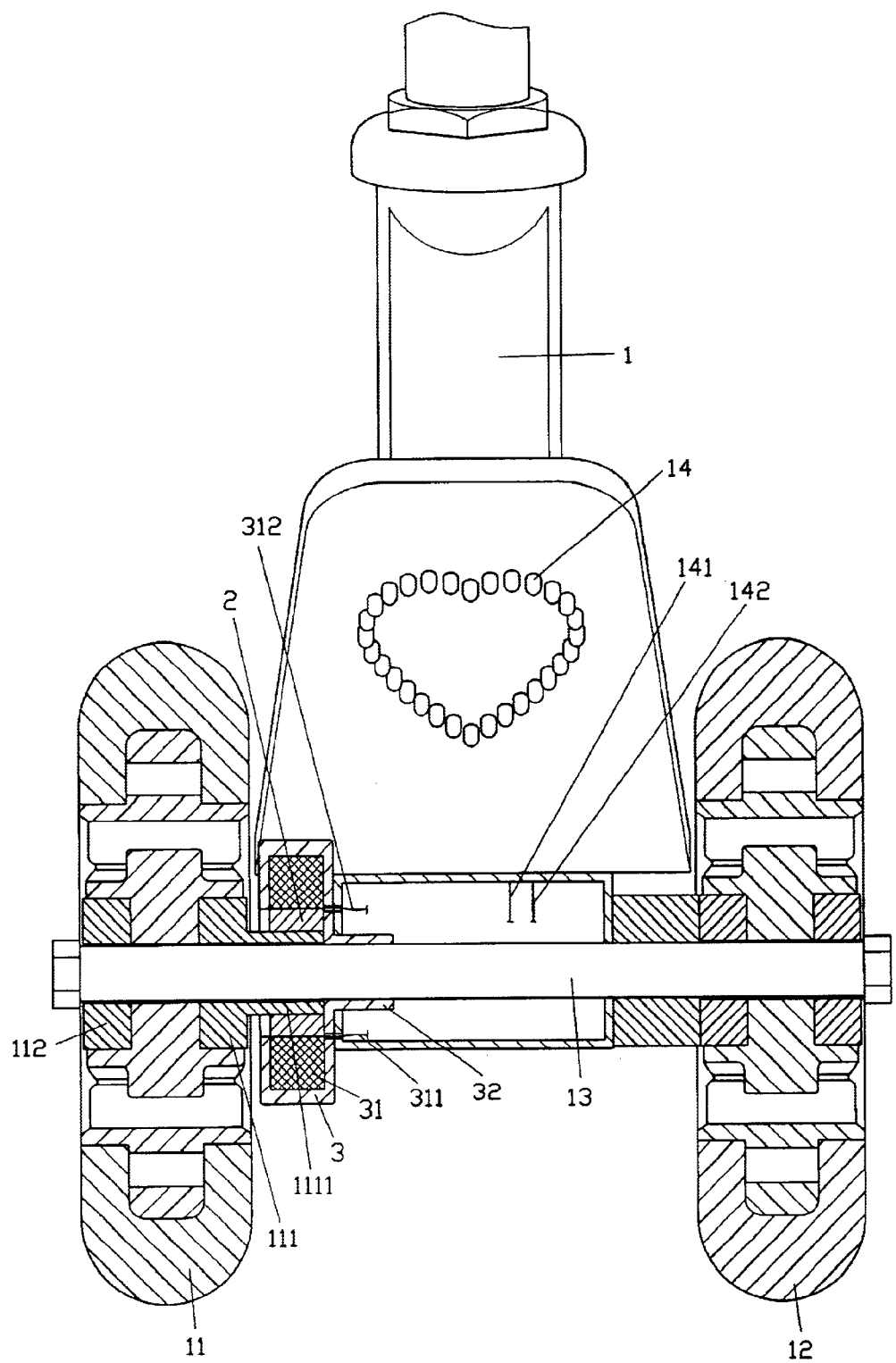
FIG. 1 is a front view of a vehicle incorporated with the present invention, with partially sectioned.
Figure 2:
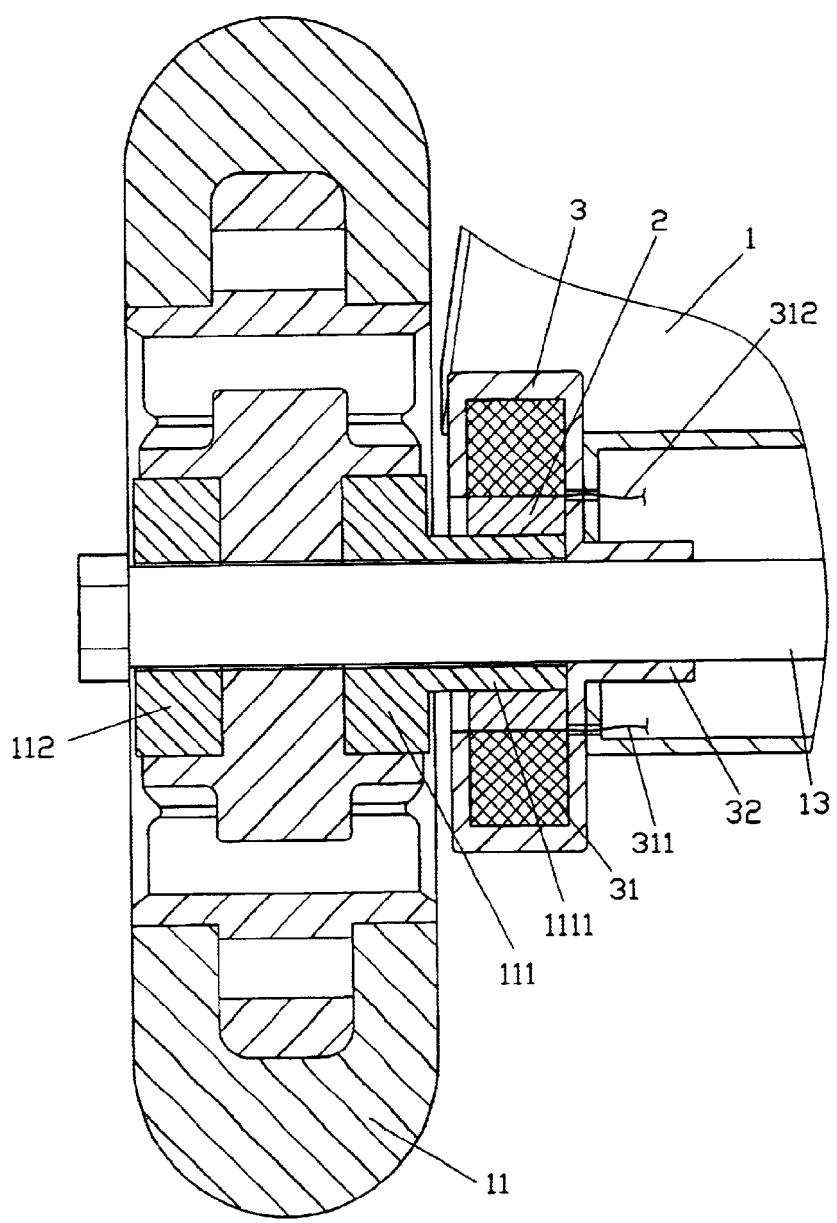
FIG. 2 is an enlarged view of the present invention.

A renovated electrical generator of the present invention, as shown in FIGS. 1 and 2, comprises a body 1 seating on top of a shaft 13, when wheels 11 and 12 are rolling, electricity is generated. The body 1 may be a scooter, a tricycle or a bicycle.

The body 1 has a load 14 which may be in any kind of drawings formed by a set of diodes, or a sounding equipment powered by electricity. The design is limited to any particular shape or device. In this case, illuminating diodes are adopted as the load 14, which has a pair of feet 141 and 142 connected to the generator 3, shafts 111 and 112 of the wheel 11 are made of plastic material with an isolating sleeve 1111 extending from one side of the shaft 111 for a magnetic ring 2 to sleeve thereon.

The generator 3 has an inductive coil 31 with a positive wire 311 and a negative wire 312 extending from two ends thereof, and a barrel 32 extending outwardly.

To assemble, the generator 3 is slid onto the shaft 13 of the wheels 11 and 12 with the barrel 32, whereas the magnetic ring 2 will extend into the inductive coil 31, thus when rolling the wheels 11 and 12, the magnetic ring 2 sleeved on the sleeve 1111 will rotate in the inductive coil 31, which produces electricity and is transformed through the positive and the negative wires 311 and 312 to the two feet 141 and 142 of the load 14.

Figure 3:
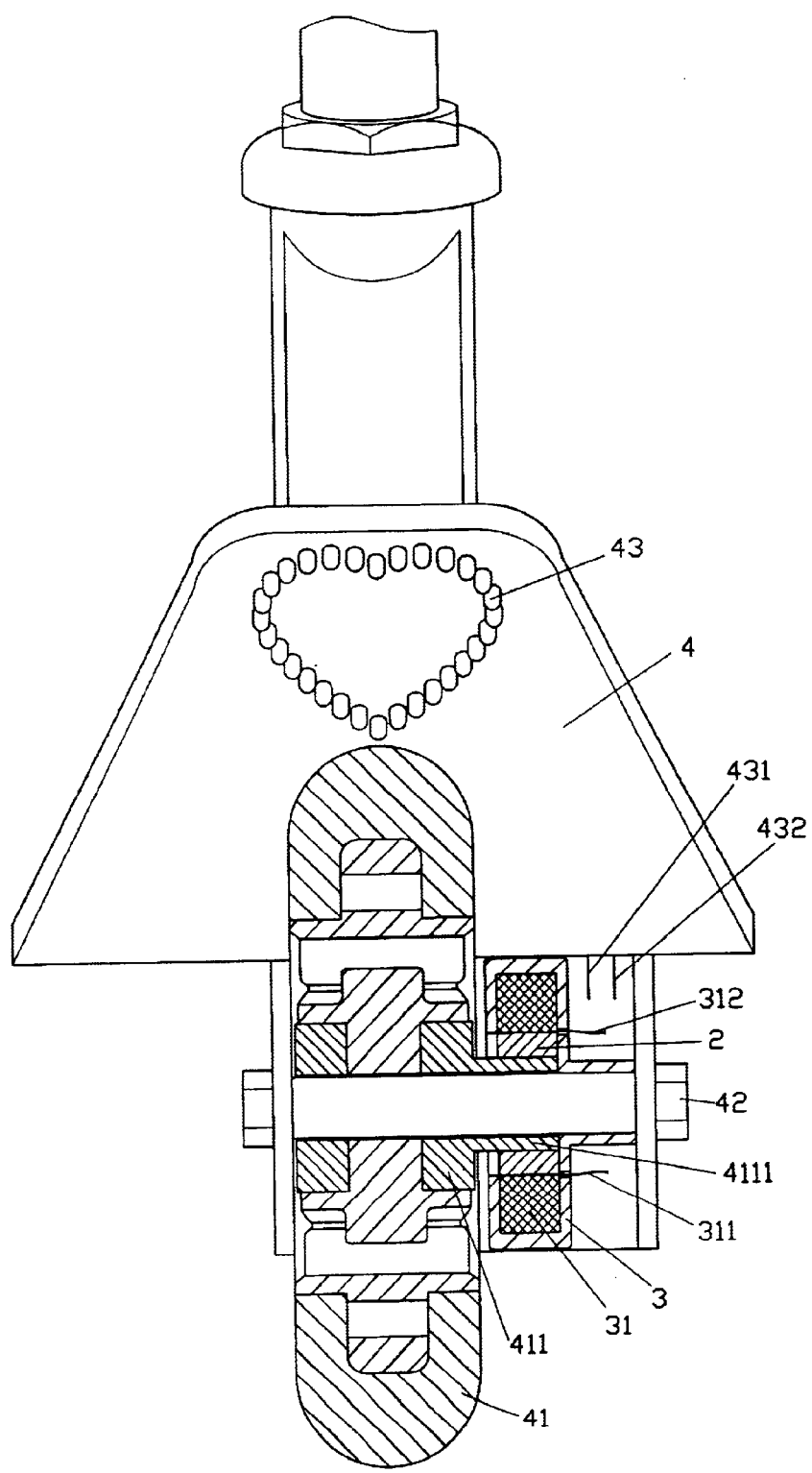
FIG. 3 is a perspective view of a second embodiment of the present invention.

The present invention may be applied on the vehicle body 4, as shown in FIG. 3, which is to insert the generator set 3 on to a shaft 42 of a wheel 41, and the magnetic ring 2 on a sleeve 4111 of a shaft 411 of the wheel 41, when rolling the wheel 41, the magnetic ring 2 on the sleeve 4111 rotate in the inductive coil 31, simultaneously, the electricity produced thereafter is transferred through two feet 431 and 432 to a load 43.

Further, the wheels 11, 12, 41 and generator 3 all are in set, when consumers purchased the product, all they have to do is to follow instruction to connect the feet 141, 142, 431, 431 of the load 14 to the positive wire 311 and the negative wire 312, which simplifies the assembly procedure and minimizes any wrong doing.

I claim:

1. An electrical generator for a vehicle having at least one wheel mounted on an axle shaft for rotation of the wheel relative to the axle shaft, said electrical generator comprising:

a housing having a centrally disposed barrel extending longitudinally from one side thereof, said barrel having a longitudinally directed through bore formed therein for mounting said housing on the axle shaft;

an annular induction coil disposed in a perimeter portion of said housing and having a pair of output leads coupled to a load;

an isolating sleeve coupled to the wheel for rotation therewith and extending over the axle shaft into said housing; and, a magnetic ring mounted on said sleeve for rotation therewith, said magnetic ring being disposed within said housing and located between said isolating sleeve said annular induction coil, wherein electrical energy is induced in said induction coil and supplied to the load responsive to rotation of the wheel.

* * * * *